Patented Oct. 11, 1949

2,484,484

UNITED STATES PATENT OFFICE 2,484,484

PROCESS FOR OBTAINING LAMINATED PRODUCTS

Kenneth L. Berry, Hockessin, Del., assignor to E. I. du Pont de Nemours & Company, Wilmington, Del., a corporation of Delaware No Drawing. Application July 6, 1948,
Serial No. 37,299

5 Claims. (Cl. 154—140)

This invention relates to adhesives, and more particularly to a method for joining polytetrafluoroethylene to itself or other solid surfaces.

Numerous attempts to join polytetrafluoroethylene to itself or to other solid surfaces by means of conventional adhesives have been unsuccessful, due to the fact that the joints formed lack one or more of the properties of sufficient strength, heat, chemical resistance, and the desired electrical properties demanded by many of the uses for the polytetrafluoroethylene.

This invention has as an object a successful method for adhesively joining polytetrafluoroethylene to itself or to another solid surface to produce a composite structure in which the members are joined by an adhesive bond of high strength. Other objects will appear hereinafter.

The above objects are accomplished by applying to one of the members to be joined a coating of a high-solids, colloidal aqueous dispersion of polytetrafluoroethylene followed by drying of the joint, preferably by heating from 30° C. to 100° C., and subsequently heating the structure above 327° C., but below the decomposition temperature of the polytetrafluoroethylene or other lamina forming the structure. By this method tetrafluoroethylene polymer can be successfully joined to itself and other substrates without application of pressure. These aqueous dispersions contain from 10% to 70%, and preferably from 30% to 70% of colloidal polytetrafluoroethylene.

The invention is further illustrated by the following examples, in which the parts are by weight.

Example I

An aqueous colloidal dispersion of polytetrafluoroethylene containing 50% by weight of the polymer and 4%, based on the weight of polymer, of sodium dodecyl sulfate is applied to ½ in. x 3 in. x 0.010 in. strips of polytetrafluoroethylene film over a length of approximately ¼ in. from each end on one side. Before the dispersion dries, two such treated surfaces are brought together and the joint so made is dried at 100° C. After drying, the joint is heated by infrared radiation from an electrically heated coil until the polymer is transparent, indicating that it is heated above its 327° C. transition temperature. The specimen is quickly cooled, and there results a strong bond between the polymer films.

A similarly made joint is heated with a hot soldering iron until it reaches approximately 330° C. A strong unitary structure results upon cooling. Two strips of polytetrafluoroethylene film without the dispersion are overlapped and the lap is heated until transparent with a hot iron. Upon cooling, it is found that no bond whatsoever results.

Example II

Bonderized autobody steel plate is painted with an aqueous 67.6% solids polytetrafluoroethylene dispersion containing 4%, based on the polymer, of sodium dodecyl sulfate. The dispersion is dried and a sheet of polytetrafluoroethylene film is sandwiched with the steel facing the dispersion-treated side. This sandwich is heated 4 minutes at 400° C. between the platens of a hydraulic press under less than 50 lbs./sq. in. pressure. The assembly is cooled by plunging into cold water, and there results a tightly bonded lamination of the steel and polymer. A similar control experiment without the treatment of the steel with polytetrafluoroethylene dispersion results in no bond.

The surfaces to be joined can be coated with the aqueous colloidal polytetrafluoroethylene dispersion by painting, dipping, doctoring, or spraying. After the coated surfaces are brought into contact, they can be dried at room temperature or in an oven or by radiant heating to effect the bond, with or without the application of pressure.

It is then necessary to heat the bond to above 327° C., to yield a strong unitary structure. This heating can be accomplished by using an oven, infrared heating, a hot iron, or the like. The duration of heating above 327° C. is not critical. Periods of from 1 sec. or less to 1 minute or more suffice to achieve coalescence of the colloidal polymer particles and their adhesion or cohesion to adjacent surfaces. In view of the difficulty of heat sealing polytetrafluoroethylene, it is particularly unexpected that laminations of two sheets of polytetrafluoroethylene can be effected without the use of pressure, using the colloidal polytetrafluoroethylene dispersions in accordance with this invention.

The high solids, colloidal aqueous dispersions used in the practice of this invention can be obtained by the method disclosed in my application Serial No. 695,059, filed September 5, 1946. In accordance with that method the aqueous dispersions which are obtained by polymerizing tetrafluoroethylene in the presence of water, and which are too dilute and unstable for practical utility, are concentrated and stabilized by adding a surface active agent, flocculating the polymer by insolubilizing the surface active agent, separating the flocculated polymer from the bulk of the aqueous phase, and forming the concentrated dispersion by peptization of the polymer floc. The average particle size of the polymer in these dispersions is not more than about 0.5 micron. The following is a specific procedure for obtaining these dispersions wherein the flocculation is accomplished by addition of a 1% solution of a mineral acid to the dilute dispersion containing about 0.2% polyammonium styrene/maleamate. Five hundred parts of an aqueous colloidal dispersion containing 3.2% polytetrafluoroethylene is made neutral to litmus by addition of ammonia. To this dispersion 48 parts of a 1% aqueous solution of polyammonium styrene/maleamate is added. The resulting dispersion is acidified with 10 parts of 1% HCl, whereupon the polymer flocculates. The mixture is centrifuged and the clear supernatant liquid decanted. The sedimented polymer floc is made basic with 0.5 part of concentrated aqueous ammonium hydroxide (28%) and shaken. In this manner a colloidal dispersion containing 40.5% polytetrafluoroethylene is obtained.

The method of this invention can be used to join surfaces of polytetrafluoroethylene to metal, glass (including glass fabrics), mica, asbestos, chinaware, plastics, natural and synthetic resins, wood, and the like.

The articles to which polytetrafluoroethylene can be bonded in accordance with the methods of this invention include metal piping and reaction kettles, which, by virtue of their coating of polytetrafluoroethylene, are rendered resistant to most chemicals. This invention can also be used in constructing laminates of polytetrafluoroethylene films where a thick film of this material is desired, as in electrical insulation, etc. By the use of the aqueous colloidal polytetrafluoroethylene dispersions as adhesives for the polytetrafluoroethylene, a unitary structure is obtained which offers advantages in chemical and heat resistances and electrical properties over a non-homogeneous structure formed with a different adhesive.

As many apparently widely different embodiments of this invention may be made without departing from the spirit and scope thereof, it is to be understood that I do not limit myself to the specific embodiments thereof except as defined in the appended claims.

I claim:

1. A process for adhesively joining the surfaces of two members, one of which is solid tetrafluoroethylene polymer, said process comprising applying to a surface of at least one of said members a coating of an aqueous dispersion of colloidal polytetrafluoroethylene containing a surface-active agent and from 10% to 70% by weight of colloidally dispersed polytetrafluoroethylene, contacting the coated surface with a surface of the other member to be joined, drying the coating of aqueous dispersion, and then heating the laminated assembly thus obtained to a temperature of at least 327° C.

2. A process for adhesively joining the surfaces of two members, one of which is solid tetrafluoroethylene polymer, said process comprising applying to a surface of at least one of said members a coating of an aqueous dispersion of colloidal polytetrafluoroethylene containing a surface-active agent and from 10% to 70% by weight of colloidally dispersed polytetrafluoroethylene, contacting the coated surface before drying of the coating with a surface of the other member to be joined, heating the coating of aqueous dispersion at a temperature of from 30° C. to 100° C. until the coating is dry, and then heating the laminated assembly thus obtained to a temperature of at least 327° C.

3. A process for adhesively joining the surfaces of two members, one of which is solid tetrafluoroethylene polymer, said process comprising applying to a surface of at least one of said members a coating of an aqueous dispersion of colloidal polytetrafluoroethylene containing a surface-active agent and from 10-70% by weight of colloidally dispersed polytetrafluoroethylene, drying the coating of the aqueous dispersion, contacting the coated surface with a surface of the other member to be joined, and heating the laminated assembly thus obtained to a temperature of at least 327° C. under sufficient pressure to hold the surfaces in contact with each other.

4. The process set forth in claim 1 in which both of said members are polytetrafluoroethylene.

5. The process set forth in claim 3 in which both of said members are polytetrafluoroethylene.

KENNETH L. BERRY.

REFERENCES CITED

The following references are of record in the file of this patent:

UNITED STATES PATENTS

| Number | Name | Date |
| --- | --- | --- |
| 1,976,679 | Fikentscher | Oct. 9, 1934 |
| 2,440,190 | Alfthan | Apr. 20, 1948 |
| 2,451,370 | Alderson | Oct. 12, 1948 |
| 2,454,625 | Bondon | Nov. 23, 1948 |
| 2,456,177 | Cupery | Dec. 14, 1948 |
| 2,459,720 | Poltorak | Jan. 18, 1949 |